United States Patent [19]

Suzuki

[11] Patent Number: 4,855,790

[45] Date of Patent: Aug. 8, 1989

[54] RECORDING APPARATUS

[75] Inventor: Yasuhito Suzuki, Kanagawa, Japan

[73] Assignees: Cannon Kabushiki Kaisha, Tokyo, Japan; Canon Kabushiki Kaisha, Tokyo, Japan

[21] Appl. No.: 190,473

[22] Filed: May 5, 1988

[30] Foreign Application Priority Data

May 12, 1987 [JP] Japan ................................ 62-116560

[51] Int. Cl.[4] ........................ G03B 27/32; G03B 27/52

[52] U.S. Cl. ........................................ 355/24; 355/208; 355/318; 355/319

[58] Field of Search .............. 355/3 SH, 14 SH, 14 C, 355/24; 271/3.1

[56] References Cited

U.S. PATENT DOCUMENTS

| | | | |
|---|---|---|---|
| 4,248,528 | 2/1981 | Akiyama et al. | 355/14 R |
| 4,278,344 | 7/1981 | Sahay | 355/14 SH |
| 4,607,948 | 8/1986 | Naito | 355/24 |
| 4,699,503 | 10/1987 | Hyltoft | 355/24 X |
| 4,734,738 | 3/1988 | Yamanaka et al. | 355/24 X |
| 4,771,318 | 9/1988 | Noguchi et al. | 355/24 X |
| 4,774,545 | 9/1988 | Tsuji et al. | 355/24 X |
| 4,780,745 | 10/1988 | Kodama | 355/24 X |
| 4,799,079 | 1/1989 | Ujino et al. | 355/3 SH X |
| 4,804,997 | 2/1989 | Mizude et al. | 355/3 SH X |
| 4,806,979 | 2/1989 | Tokoro et al. | 355/24 X |

*Primary Examiner*—Richard A. Wintercorn

*Attorney, Agent, or Firm*—Fitzpatrick, Cella, Harper & Scinto

[57] ABSTRACT

A recording apparatus includes an image forming mechanism for forming an image on a sheet-shaped recording medium, a discriminating circuit for discriminating an image related to predetermined information among images to be formed on sheet-shaped recording mediums by the image forming mechanism to produce a discrimination signal, and an inverting mechanism for selectively inverting front and back sides of each of sheet-shaped recording mediums on which images are formed by the image forming mechanism on the basis of the discrimination signal produced by the discrimination circuit.

11 Claims, 4 Drawing Sheets

RECORDING APPARATUS

BACKGROUND OF THE INVENTION

1. Field of the Invention

This invention relates to a recording apparatus for forming an image on a sheet-shaped recording medium.

2. Description of the Related Art:

In the past, in the recording apparatus of this kind, the order in which the successive recorded sheets are stacked is constant. Particularly with the recording apparatus which produces a great number of sheets, in order to make right the collation of the pages of the recorded sheets, it has been usual to carry out the stacking in such a way that in one-sided recording, the recorded side, or in two-sided recording, the side of latest recorded side, is oriented face-down.

For an example of a recording apparatus capable of delivering recorded sheets in correct page collation, mention may be made of U.S. Pat. No. 4,278,344.

It is also known in the art to provide even another type of recording apparatus in which, in the sequential recording mode for recording a series of different data, in order that the recorded sheets can be distinguished from data to data, after a sheet having one data recorded thereon has been delivered, a sheet having nothing recorded thereon is delivered as the partition paper, before the sheet having the next data recorded thereon is delivered, as disclosed in Japanese Laid-Open Patent Application No. Sho 55-161265.

However, in the above-described conventional examples, when the recorded sheets are to be separated into units of a series of data, to be specified by the assortment, to be allocated, or to be subjected to other handlings, there is a need to turn the pile of the recorded sheets upside down to confirm the contents of the recorded sheets. This necessity not only makes these handlings difficult and troublesome, causing the efficiency to decrease, but also gives an opportunity for accidents such as those of collapsing the pile of the sheets when it is being turned upside down, scattering them in all directions, improperly collating the scattered sheets when collected collected, or damaging some of the sheets themselves.

Also, in U.S. Pat. No. 4,248,528, there is disclosed another apparatus in which a set of original document sheets having thereon data to be recorded is preceded by a control sheet having instructions for recording the document set. But this also does not improve the efficiency of the assorting or allocating operation of the recorded sheets in each data.

SUMMARY OF THE INVENTION

An object of the invention is to eliminate the present above-described drawbacks of the conventional recording apparatus.

In other words, the invention provides a recording apparatus which delivers sheets having a series of data recorded thereon in such a way that they can be handled for separation, assortment, allocation, etc. in each data with an improved efficiency.

According to the invention, the apparatus is provided with means for inverting front and back sides of a recorded sheet, and means for discriminating a sheet on which a heading information page is recorded based on which the above-described separating, assorting, or allocating operation is carried out, wherein the above-described heading information page is stacked face-up, so that an improvement of the efficiency of the above-described separating, assorting, or allocating operation and avoidance of accidents can be achieved.

DETAILED DESCRIPTION OF THE PREFERRED EMBODIMENTS

Figure 1:
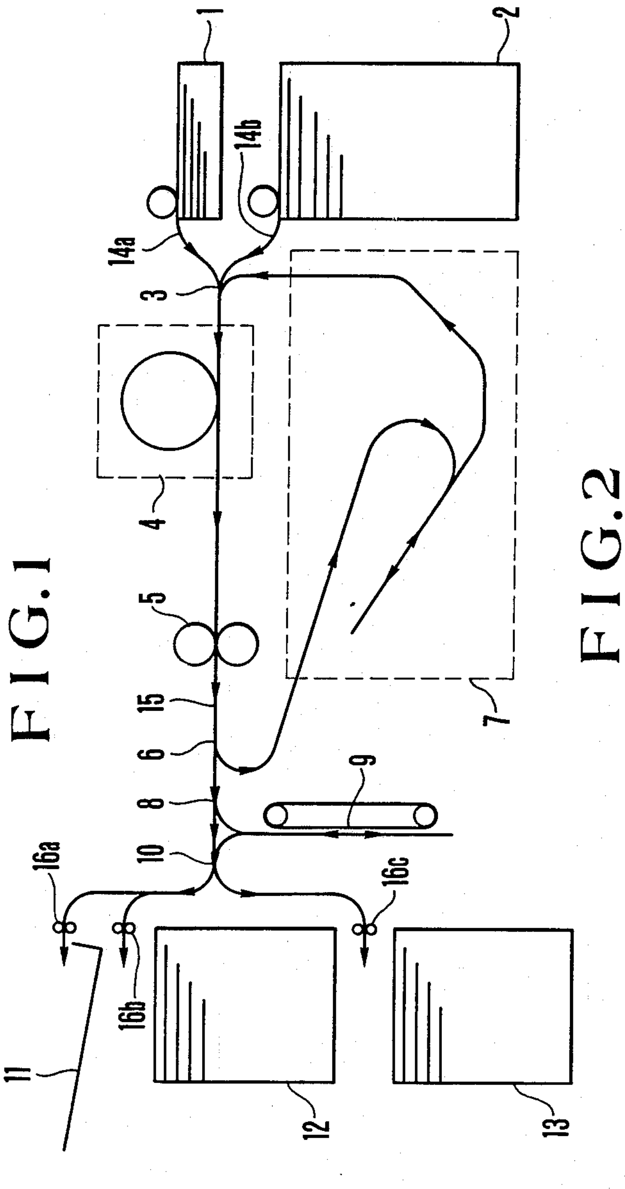
FIG. 1 is a schematic diagram of an embodiment of an electrophotography type two-side printer according to the invention.

In FIG. 1 there is shown an embodiment of the invention wherein the electrophotography type two-side printer includes first and second sheet feeding mechanisms 1 and 2, transport paths 14*a* and 14*b* through which sheets from the sheet feeding mechanisms 1 and 2, respectively, are fed past a confluence 3 to a printing station 4 where a toner image is transferred onto the sheet by using the publicly known electrophotographic technique, a fuser 5 in which the toner image on the sheet is fused to the sheet, and a first diverging portion 6 at which the sheet fed from the fusing station 5 through a transport path 15 is either routed to an inverting mechanism 7 where front and back sides of the sheet are inverted to reach the confluence 3, or goes to a second diverging portion 8 at which the fed sheet is routed to a switch-back portion 9 where front and back sides of the sheet are inverted.

A third diverging portion 10 leads to a selected one of three delivering means 16*a*, 16*b* and 16*c* cooperating respectively with a sample tray 11 into which sheets of arbitrary sizes such as trial print sheets can be inserted, and first and second containers 12 and 13 on which the sheets outputted from the printer are stacked in normal collated order.

When in the usual one-side print mode, a sheet expelled from one of the sheet feeding mechanisms 1 and 2 goes past the confluence 3 to the printing station 4 where the toner image is transferred to the upper side of the sheet as viewed in FIG. 1, and therefrom to the fuser 5 where the toner image is fused.

After the completion of the one-side printing, the first diverging portion 6 directs the sheet toward the delivering station (leftward as viewed in the drawing) and then the second diverging portion 8 brings it into the switch-back portion 9.

In the switch-back portion 9, the sheet from the diverging portion 8 is once fully taken in. After that, the sheet is sent out with its rear end by now ahead to the third diverging portion 10. In such a switching back operation, front and back sides of the sheet are inverted. At the diverging portion 10, either one of the containers 12 and 13 is selected for use in stacking the successive sheets thereon.

Since the printed side is turned down in the switch-back portion 9, the page order in the container 12 or 13 is correctly maintained.

Next, when in the two-side print mode, a sheet from the sheet feeding mechanism 1 or 2 is fed past the confluence 3 to the printing station 4 where a toner image of the first page is transferred to the upper side of the sheet as viewed in FIG. 1. The toner image is then fused by the fuser 5. The foregoing results in the completion of the one-side printing. After that, the diverging portion 6 turns the sheet away to the inverting mechanism 7 where front and back sides of the sheet are inverted. The side-inverted sheet is then sent to the confluence 3. Here, that side of the sheet which has been printed faces downward. In the printing station 4, therefore, the upper or blank side of the sheet is printed with the second page. After the toner image is fused by the fuser 5, the two-sided printing is complete.

Assuming here that, of both sides the each of sheets, the upper sides of the sheets are first printed with front pages (or the odd-numbered pages, namely, 1, 3, 5, . . . ), and for the second time the back sides are printed with the back pages (or the even-numbered pages, namely 2, 4, 6, . . . ), then at the time of completion of the two-sided printing, the front pages are face-down and the back pages are face-up.

Therefore, after both sides have been printed, the sheets at the diverging portion 6 are directed toward the stacker, and then at the diverging portion 8 bypass the switch-back station 9 to the diverging portion 10 at which a predetermined one of the containers 12 and 13 is selected to receive the sheets. Such a procedure results in stacking the sheets in normal page collated order.

Figure 2:
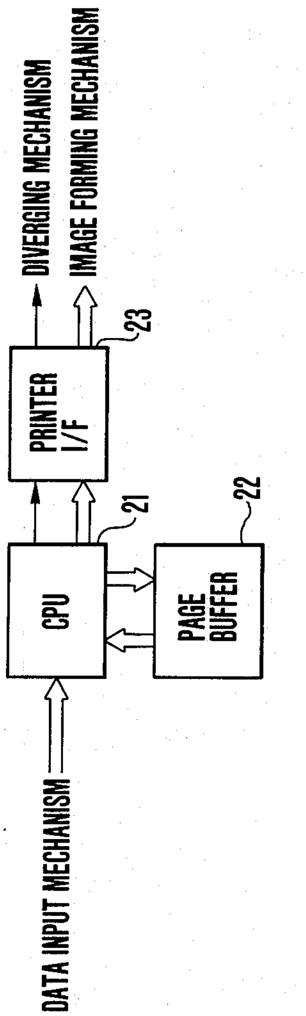
FIG. 2 is a control block diagram of the embodiment of the invention.

FIG. 2 is a block diagram illustrating the flow of the control signals in the embodiment of the invention. A CPU 21 governs the control of the entirety of the printer system, and also analyzes the input data from a data input mechanism (not shown). The print data analyzed by the CPU 21 are stored in units of a page on a page buffer 22. A printer interface (I/F) 23 under the control of the CPU 21 permits the print data on the page buffer 22 to be transferred page by page to an image forming mechanism (not shown) to be printed at the printing station 4.

Figure 3:
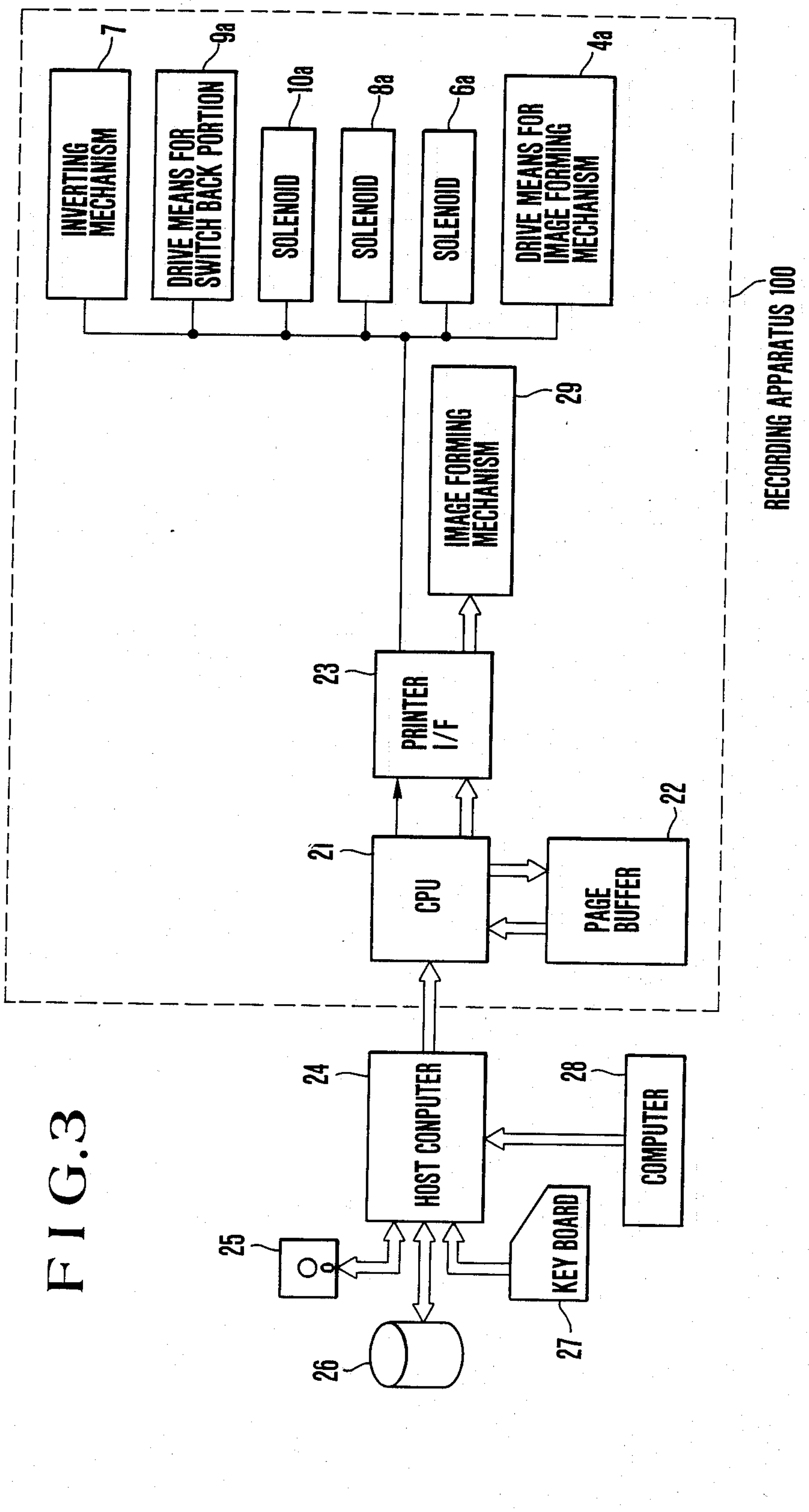
FIG. 3 is a control block diagram illustrating the recording apparatus which is the embodiment of the invention connected to a host computer.

FIG. 3 is a more detailed control block diagram of the embodiment of the invention. The duplicated parts with FIG. 2 are labelled with common reference characters and their explanation is omitted.

As the data input mechanism for the recording apparatus 100, use is made in this embodiment of a host computer 24. The host computer 24 gives or receives data with a memory device such as a floppy disk 25, or fixed disk 26. The data not only from a key board 27 but also another computer 28 is applied to the host computer 24. The data after having been processed in the host computer 24, is applied to the recording apparatus 100. A series of data produced by the host computer 24 includes heading data at the tail thereof. The term "heading data" herein used means that data which allow that series of data to be distinguished from the other data. The heading data includes, for example, titles, classification, addresses, etc. The heading data are last memorized when the series of data are stored in the memory device 25 or 26. In some case, soon after the transferring of all the data in one series from the host computer 24 to the recording apparatus 100 is completed, the heading data are automatically generated by the host computer 24 and transferred subsequently to that series of data.

The printer I/F 23, while sending the data to the image forming mechanism 29, sends control signals to the various drive portions, namely, drive means 4a for driving image forming means, a solenoid 6a for driving a deflector (not shown) in the diverging portion 6 to determine whether the image-formed sheets are directed to the inverting mechanism 7 or to the stacker, another solenoid 8a for driving a deflector (not shown) in the diverging portion 8 to determine whether the sheets are directed to the switch back portion 9 or to the stacker, drive means 9a for driving the switch-back portion 9, and another solenoid 10a for driving a deflector (not shown) to determine whether the sheets are directed to the container 12 or 13.

Figure 4:
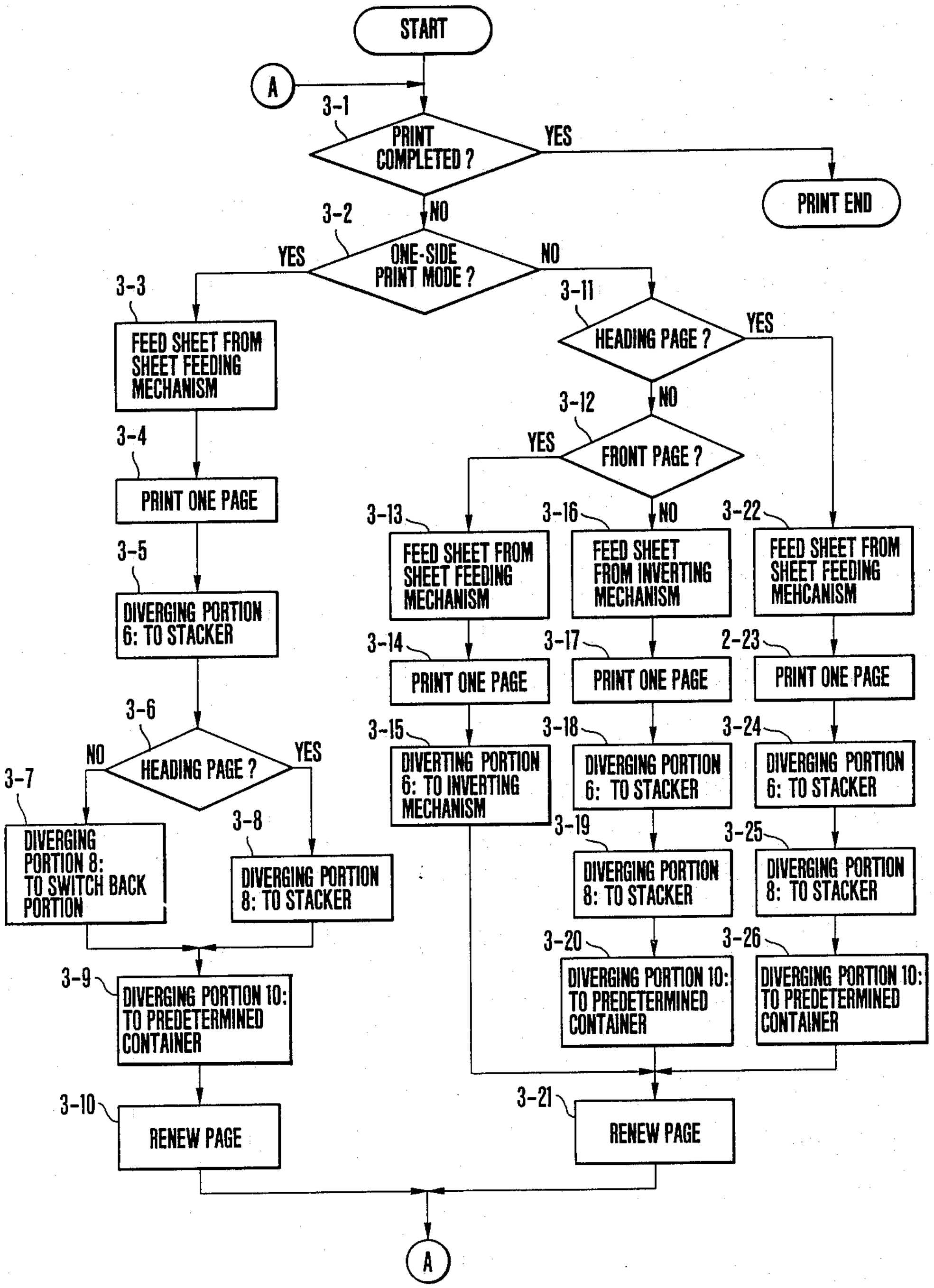
FIG. 4 is a flowchart of a print control program in the embodiment of the invention.

FIG. 4 is a flowchart of the program for controlling the printing in this embodiment.

The CPU 21 receives the data from the data input mechanism and examines whether or not the printing is complete (Step 3-1). If the printing is in progress, the CPU 21 then determines whether or not the one-side print mode is selected (Step 3-2). If so, one of the sheet feeding mechanisms 1 and 2 feeds the sheet (Step 3-3), and the data which has been stored on the page buffer 22 is printed through the print I/F 23 at the printing station 4 (Step 3-4). Then, the diverging portion 6 is commanded to direct the one-side printed sheet from the fuser 5 to the stacker (Step 3-5).

Next, the CPU 21 examines whether or not the inputted data is the heading data (Step 3-6). If not, then it commands the diverging portion 8 to direct the sheet to the switch-back portion 9 for inverting front and back sides of the sheet so that the printed side is face-down (Step 3-7), and the diverging portion 10 to deliver the sheet to a predetermined one of the containers 12 and 13 (Step 3-9). Since in the switch-back portion 9 the printed side is turned down, the successive delivered sheets are stacked in the container 12 or 13 in correct collated page order.

If, in the step 3-6, the heading page is detected, then the CPU 21 commands the diverging portion 8 to bypass the switch-back portion 9 so that the sheet is sent with the printed side left face-up to the stacker (Step 3-8), and commands the diverging portion 10 to deliver the sheet to a predetermined one of the containers (Step 3-9).

Thus, the heading page is put with the printed side turning upward on the top of a set of printed sheets of a series of data. Therefore, it is very easy to output that series of data in separation.

After the printing of one page in the one-side print mode by the sequence of the steps 3-1 to 3-9 has been completed, the next page is to be printed. For this purpose, the page is renewed (step 3-10), and return to the step 3-1 occurs to continue printing.

If in the step 3-2 the selected mode is not the one-side print mode, then the flow advances to a two-sided print subroutine beginning with a step 3-11. In the step 3-11, the CPU 21 examines the input data and determines whether or not it is a heading page. If not, the CPU 21 then determines whether or not it is a page for the front side of the two sides (Step 3-12). If so, a predetermined one of the sheet feeding mechanisms 1 and 2 feeds the sheet (Step 3-13). In a manner similar to that in the step 3-4, one page is printed (Step 3-14). The diverging portion 6 is then commanded to send the one-side printed sheet to the inverting mechanism 7 (Step 3-15). This sheet is, after its front and back sides have been inverted by the inverting mechanism 7, sent to the confluence 3 where the sheet waits for printing of the second side.

As the foregoing results in the completion of the printing of one page on the front side, the page is renewed according to the predetermined two-side print page renew subroutine (Step 3-21). Then, the flow returns to the step 3-1 to start printing of the next page.

If in the step 3-12 it is not the front page, then a treatment for the back page beginning with a step 3-16 is performed.

In the step 3-16, the one-side printed sheet is fed from the inverting mechanism 7. In a manner similar to that in the step 3-4, one page is printed on the second side=back side (Step 3-17).

Then, the diverging portions 6 and 8 are commanded to feed the sheet to the stacker (straight to the left as viewed in FIG. 1) (Steps 3-18 and 3-19). The diverging portion 10 is commanded to deliver the sheet to the predetermined container (Step 3-20). Here, of the two sides of the sheet, the front=odd-numbered page is printed on the downward facing side, and the back=even-numbered page is printed on the upward facing side. Therefore, in the container 12 or 13, the successive sheets are stacked in right collated page order.

After the back side printing is completed, the page is renewed according to the predetermined two-side print page renew subroutine. Then, the flow returns to the step 3-1.

If in the step 3-11 it is the heading page, then the flow advances to the heading page print subroutine beginning with a step 3-22.

In the step 3-22, the CPU 21 acutates a predetermined one of the sheet feeding mechanisms 1 and 2 (step 3-22). In a manner similar to that in the step 3-4, one page for the heading page is printed on a sheet (Step 3-23).

Then, the diverging portions 6 and 8 are commanded to send the sheet toward the stacker (Steps 3-24 and 3-25). And, the diverging portion 10 is commanded to deliver the sheet to the predetermined container (Step 3-26).

In this case also, the heading page is face-up on the stack of the sheets in the container 12 or 13 to allow for easy separation and confirmation of the series of data.

When the printing of one page for the heading is completed, the page is renewed according to the predetermined two-side print page renew subroutine (Step 3-21). Then, the flow returns to the step 3-1.

Figure 5:
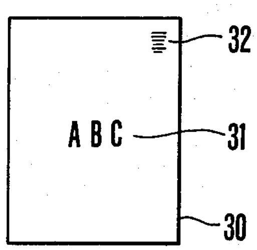
FIG. 5 and FIG. 6 are diagrams illustrating an example of heading data discriminating means.
Figure 6:
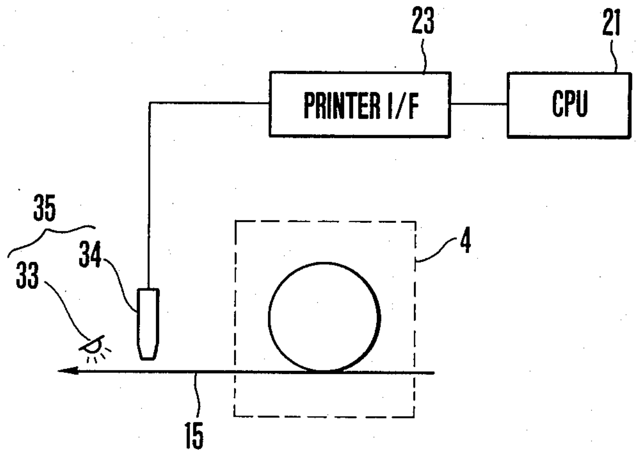

In the above-described embodiment, the discrimination of the heading data is performed by the CPU 21 in examining the input data. But it is not confined thereto. It may otherwise be carried out, for example, by reading the image formed on the sheet at the printing station 4 by using a CCD or photo-sensor and analyzing this. If the heading data includes an image (bar code, mark, etc.) that the machine is easy to read in a predetermined position of the sheet as shown in FIG. 5, the heading data can be discriminated by a simple device. In FIG. 5, on a sheet 30, besides an image 31 of the heading data that the human being recognizes, there is printed a bar code 32 representing that this sheet 30 has the image of the heading data in a predetermined position on the right shoulder of the sheet 30. And, as shown in FIG. 6, a bar code reader 35 comprised of an LED 33 for illumination and a photosensor 34 is arranged in a position capable of reading the bar code 32 on the lower side of the printing station 4 of the transport path 15. In a predetermined timing that the bar code 32 of the sheet 30 being transported through the transport path 15 comes to the position capable of reading in by the bar code reader 35, the bar code 32 is read in the CPU 21 through the printer interface 23. The CPU 21 discriminates the heading data by the read bar code 32.

Also, in the above-described embodiment, the recording apparatus is of the type in which the toner image is transferred to the sheet-shaped recording medium by electrophotographic technique, for example, laser beam printer. But it is not confined thereto. As the other recording apparatus to which the invention can be applied, mention may be made of the wire dot printer, ink jet printer, bubble jet printer and thermal ink transfer printer, and others providing the capability of forming an image on a sheet-shaped recording medium.

What is claimed is:

1. A recording apparatus comprising:

image forming means for forming an image on a sheet-shaped recording medium;

discriminating means for discriminating an image related to predetermined information among images to be formed on sheet-shaped recording mediums by said image forming means to produce a discrimination signal; and inverting means for selectively inverting front and back sides of each of sheet-shaped recording mediums on which images are formed by said image forming means on the basis of the discrimination signal produced by said discriminating means.

2. An apparatus according to claim 1, wherein said discriminating means discriminates an image related to information which is a heading necessary to separate, assort, address, etc. sheet-shaped recording mediums on which images are formed in each series of data.

3. An apparatus according to claim 1, wherein said inverting means inverts front and back sides of a sheet-shaped recording medium so that the image related to the predetermined information becomes face-up.

4. A recording apparatus comprising:

image forming means for forming an image on a sheet-shaped recording medium;

transport means for transporting the sheet-shaped recording medium on which the image is formed by said image forming means;

inverting means for selectively inverting front and back sides of the sheet-shaped recording medium transported by said transport means.

control means for controlling said inverting means so that among sheet-shaped recording mediums on which images are formed, a sheet-shaped recording medium on which an image related to predetermined information is formed is transported with said image related to the predetermined information being faced upward.

5. An apparatus according to claim 4, wherein said control means includes means for discriminating a sheet-shaped recording medium on which an image related to heading information including a title, assortment, allocation, address of information of sheet-shaped recording mediums on which images related to a series of information are formed from sheet-shaped recording mediums on which images related to other information are formed.

6. An apparatus according to claim 5, wherein said control means controls said inverting means so that a side on which the image concerning the heading information is formed is transported face-up.

7. An apparatus according to claim 5, wherein said image forming means forms an image on only one side of the sheet-shaped recording medium, and said control means controls said inverting means so that front and back sides of only a sheet-shaped recording medium on which an image related to information other than the heading information is formed are inverted.

8. A recording apparatus comprising:

image forming means for forming an image of input data on a sheet-shaped recording medium;

delivery means for delivering the sheet-shaped recording medium on which the image is formed by said image forming means;

discrimination means for determining whether or not said input data is data related to a predetermined kind of information to produce a discrimination signal;

a transport path for transporting the sheet-shaped recording medium on which the image is formed by said image forming means to said delivery means;

inverting means for selectively inverting front and back sides of the sheet-shaped recording medium transported by said transport path on the basis of the discrimination signal produced by said discrimination means; and stacking means for stacking the sheet-shaped recording medium delivered by said delivery means.

9. An apparatus according to claim 8, wherein said discrimination means produces the discrimination signal when said input data is heading data for distinguishing a series of data groups from other data groups.

10. An apparatus according to claim 9, wherein said heading data includes one of a title, classification and address of a series of input data.

11. An apparatus according to claim 9, wherein said image forming means forms an image on only one side of the sheet-shaped recording medium, and said inverting means performs an inverting operation so that only a sheet-shaped recording medium on which an image of said heading data is formed is stacked with the image side facing upward in said stacking means.

* * * * *

UNITED STATES PATENT AND TRADEMARK OFFICE

CERTIFICATE OF CORRECTION

PATENT NO. : 4,855,790

DATED : August 8, 1989

INVENTOR(S) : YASUHITO SUZUKI

It is certified that error appears in the above-identified patent and that said Letters Patent is hereby corrected as shown below:

COLUMN 1, line 16, "side of" should be deleted;

lines 48-49, "having" should continue after "sheet" with no paragraph break;

line 55, "present" should be deleted.

COLUMN 3, line 16, "the" should read --of--;
same line, "of sheets" should read --of the sheets--.

COLUMN 6, line 9, "As the" should read --As--.

Signed and Sealed this

Twenty-sixth Day of June, 1990

*Attest:*

HARRY F. MANBECK, JR.

*Attesting Officer*

*Commissioner of Patents and Trademarks*